United States Patent
Haakana

(10) Patent No.: US 7,822,659 B2
(45) Date of Patent: Oct. 26, 2010

(54) CONTENT CHARGING

(75) Inventor: Pirjo Haakana, Tampere (FI)

(73) Assignee: Nokia Corporation, Espoo (FI)

( * ) Notice: Subject to any disclaimer, the term of this patent is extended or adjusted under 35 U.S.C. 154(b) by 1093 days.

(21) Appl. No.: 10/473,078

(22) PCT Filed: Mar. 27, 2002

(86) PCT No.: PCT/IB02/00961
§ 371 (c)(1),
(2), (4) Date: Nov. 14, 2003

(87) PCT Pub. No.: WO02/080061
PCT Pub. Date: Oct. 10, 2002

(65) Prior Publication Data
US 2004/0111364 A1    Jun. 10, 2004

(30) Foreign Application Priority Data
Mar. 29, 2001 (GB) ................................. 0107925.0

(51) Int. Cl.
*G06Q 40/00* (2006.01)
(52) U.S. Cl. .......................... 705/35; 705/36 R; 705/37
(58) Field of Classification Search ................... 705/35, 705/36 R, 37
See application file for complete search history.

(56) References Cited

U.S. PATENT DOCUMENTS

| | | | |
|---|---|---|---|
| 5,878,141 A | 3/1999 | Daly et al. | |
| 6,980,972 B1 * | 12/2005 | Allibhoy et al. | 705/51 |
| 7,089,208 B1 | 8/2006 | Levchin et al. | 705/39 |
| 7,191,151 B1 | 3/2007 | Nosek | 705/39 |
| 7,242,922 B2 * | 7/2007 | Fieldhouse et al. | 455/406 |
| 7,249,094 B2 | 7/2007 | Levchin et al. | 705/39 |
| 7,430,537 B2 | 9/2008 | Templeton et al. | 705/39 |
| 7,475,043 B2 | 1/2009 | Light et al. | 705/64 |
| 7,533,064 B1 | 5/2009 | Boesch | 705/67 |
| 7,536,336 B1 | 5/2009 | Guinan | 705/37 |
| 2001/0054059 A1 * | 12/2001 | Marks et al. | 709/201 |
| 2003/0026404 A1 * | 2/2003 | Joyce et al. | 379/144.01 |

FOREIGN PATENT DOCUMENTS

| | | |
|---|---|---|
| EP | 0 812 081 A2 | 12/1997 |
| EP | 1 033 854 A2 | 9/2000 |
| WO | WO 99/31610 | 6/1999 |
| WO | WO 00/77747 A1 | 12/2000 |
| WO | WO 01/03090 A1 | 1/2001 |

OTHER PUBLICATIONS

U.S. Appl. No. 60/100,440, U.S. Appl. No. 60/100,470.*
TelSurf Networks Introduces First Free Internet Access From Any Phone Without Need for a PC, Modem or ISP Business Editors & High Tech Writers. Business Wire. New York: Feb. 7, 2000. p. 1.*
Multi-Channel Web Digest, net2one.Com Rolls Out New-Look Web Site PR Newswire. New York: Jun. 8, 2000. p. 1.*
"An Intermediation and Payment System Technology", Pays et al, Computer Networks and ISDN Systems, vol. 28, No. 11, May 1, 1996, pp. 1197-1206, XP004018220.

* cited by examiner

*Primary Examiner*—Lalita M Hamilton
(74) *Attorney, Agent, or Firm*—Harrington & Smith

(57) ABSTRACT

A method and system for providing content charging in data networks includes the steps of: when a subscriber having an account with a charging service provider uses services having a content provided by a content provider, the content charges are collected for use of the services via the charging service provider and a value is deducted from an account associated with the subscriber in response to the collected charges. The content provider is paid for the use of the content services by the subscriber after the occurrence of a predetermined event.

17 Claims, 2 Drawing Sheets

CONTENT CHARGING

CROSS REFERENCE TO RELATED APPLICATIONS

This application is a 371 of PCT Application No. PCT/IB02/00961, filed Mar. 27, 2002, which claims priority to GB Patent Application No. 0107925.0, filed Mar. 29, 2001.

TECHNICAL FIELD

The present invention relates to a method and system for providing content charging in a data network.

BACKGROUND

Open communication networks connect large numbers of local area networks, for example networks of various organisations or businesses. The Internet is an example of one such open communication network. These networks can be accessed by a large number of users via user terminals, for example personal computers, workstations or mobile telephones. A user using a terminal may be connected to these networks directly or via some connection device such as a modem which may be a separate device or be in-built in the user terminal. By accessing these networks a user has access to a large quantity of data and/or services. It will be understood that the term services is used hereinafter to encompass various types of features including products for sale, games, electronic mail or music. All of these are accessible via various communication networks. In many cases the service providers will provide services via so-called world wide web (WWW) and hypertext mark-up language (HTML) protocols. These provide a visual Internet interface for the user terminals.

Many businesses have been set up to provide services via data networks. These businesses are said to offer content services. The term content used hereinafter will be understood to encompass the actual content of these services whether these be primarily static web pages which display information only or recorded video or audio material or games. The businesses which create and sell content will be referred to hereinafter as content providers.

Content providers may be and often are distinct from the network service providers which will typically be a telecom operator. These network service providers make provision for facilities to enable users to access the services available via the data networks. As an alternative to the telecom operator it will be understood that the term network services provider can encompass other entities, for example when other network technologies are used (e.g. Bluetooth or wireless LAN) for fetching the content. In that case there is no requirement for the telecom network when fetching the content, but the charging could be done via the telecom network. In other examples the network service provider can be the combination of telecom operator and company. A user has access to a company's local area network and via the local network to the internet.

In the past in order to be paid for providing their content, content providers have been required to enter into formal agreements with network service providers. These agreements have themselves required the exchange of information detailing both parties such as charging information and bank details. These have been required to enable the content providers to charge subscribers who use the services to which the supplied content relates.

This has the disadvantage that such agreements need to be put in place. They are slow to arrange and can even be an unmanageable process for some of the smaller content providers.

SUMMARY

It is an aim of the present invention to at least partly mitigate the above-referenced problems.

According to a first aspect of the present invention there is provided a method for providing content charging in data networks comprising the steps of:

at least one subscriber each having an account with a charging service provider uses services having a content provided by a first content provider;

collecting content charges for use of said services via said charging service provider and deducting a value from the account associated with said at least one subscriber in response to said collected charges; whereby the first content provider is paid for the use of said content services by said at least one subscriber after the occurrence of a predetermined event.

Embodiments of the present invention provide the advantage that a charging service provider which holds records of subscribers which either have a prepaid quota of credit or are trusted and have a good credit rating. Prior to the supply of content to such subscribers when they use the Internet their credit is checked by the charging service provider. If credit is good meaning they have either prepaid money on account or are trusted to pay their bills, the charging service provider gives an indication that the user can be provided with the content. At this stage the charging service provider is supplied with details of the content provider providing the content being purchased by the user. This includes contact details and details of the charge levied for supply of the content. The money exchanged for the content is paid to the charging service provider. Thereafter the charging service provider can transfer money owed to the content provider either upon request by the content provider or when the charging service provider has accumulated a predetermined amount owed to the content provider. In this way content providers can simply add and remove content for offer to users without the need to keep exchanging information directly with various other parties.

BRIEF DESCRIPTION OF THE DRAWINGS

Embodiments of the present invention will now be described hereinafter by way of example only with reference to the accompanying drawings in which.

DETAILED DESCRIPTION

Figure 1:
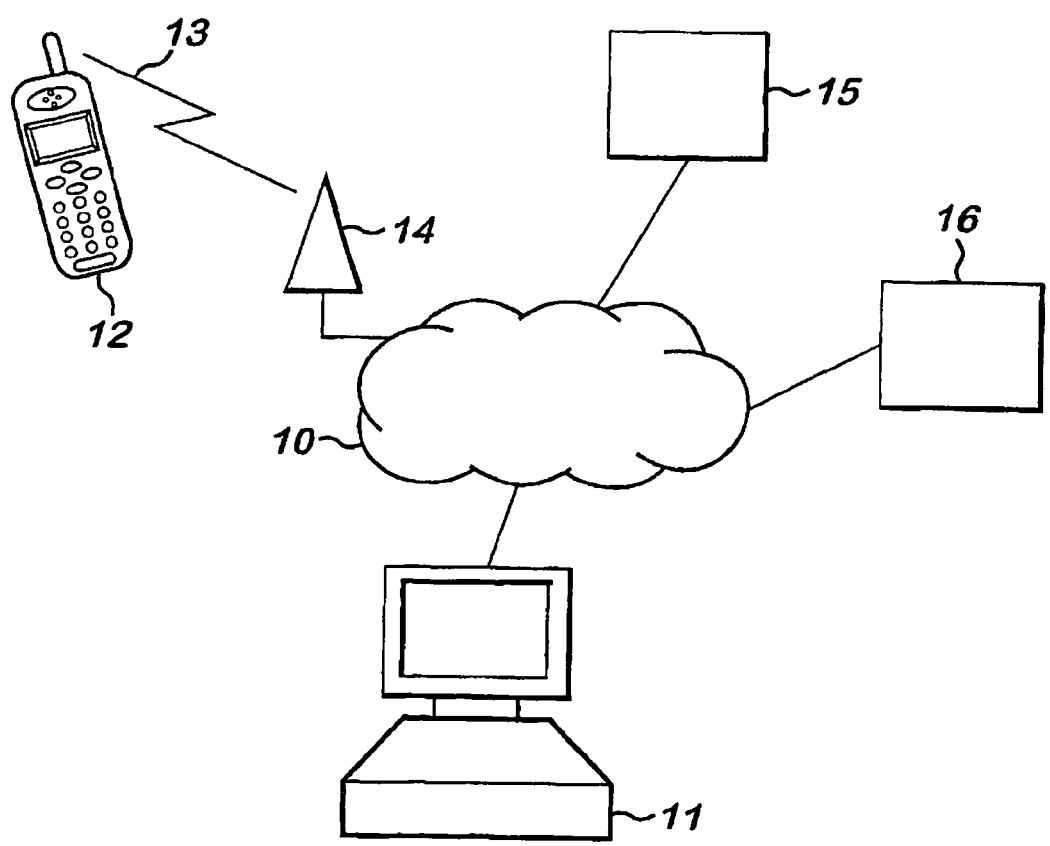
FIG. 1 illustrates a system arranged to enable users to access content services.

FIG. 1 illustrates a system according to an embodiment of the present invention. An open communication network 10 includes a number of local area networks and may for example be the Internet. The Internet 10 can be accessed by many users via user terminals. The term user terminal will be understood to include any device which enables a user to gain access to the Internet. For example a personal computer 11 or WAP (wireless application protocol) phone 12. The user terminals can be connected to the Internet 10 either directly or via modem or other such device as is known in the art. In FIG. 1 the WAP phone is connected to the Internet 10 via a radio interface 13 and base station 14.

In this way a user of the computer terminal 11 or WAP phone can browse (or surf) the Internet with a view to locating information or other services of interest. Many web sites on the Internet provide information or services free of charge. However some services require payment before they are supplied or indeed accessible to a user. In this sense it will be understood that the term services is used broadly to define something desired by a user. This can include web pages which are primarily static and supply only information such as weather reports or gambling data or recorded video or audio information such as downloading a video or records. Alternatively the services may comprise games, products, features or services such as electronic mail, assistance or advisory services.

The content of web pages which is accessed by these users is created and/or assimilated and/or kept up to date by a content provider. These are companies who make money by being paid for providing the content for services used by the user. One such content provider 15 is shown in FIG. 1 although it will be understood that there are in fact many such content providers each providing content for associated web pages.

A charging service provider 16 is also shown in FIG. 1. This represents a further party to which users of the Internet can subscribe in order to gain access to services. Users can either subscribe as prepaid users, in which case they pay a prepaid amount to the charging service provider, or post-paid users. In this latter case the credit worthiness of a user subscribing to the charging service provider 16 must first be established. Typically a post-paid subscriber will be allocated a credit limit. They can access services having a value up to this credit limit but must pay at least some of the charges before any further services can be purchased. In each case a record associated with each subscriber is stored via the charging service provider 16. As services are utilised by a subscriber the charges levied by the associated content provider 15 for that service are logged against the subscriber record. This will either result in a value in the record being decremented or a value in the record being incremented. This depends upon whether the subscriber is a prepaid or post-paid subscriber.

Figure 2:
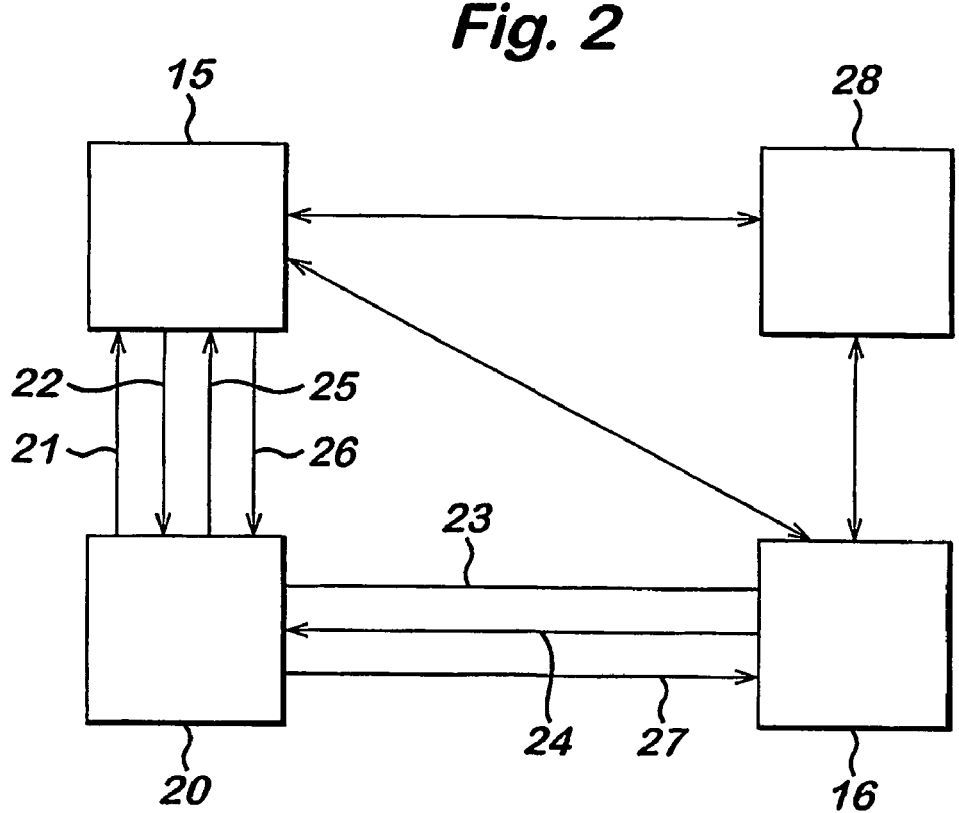
FIG. 2 illustrates the exchange of data carried out when a user purchases content services.

FIG. 2 illustrates a process of content charging in accordance with an embodiment of the present invention. A user 20 who may be using a WAP phone 12 or other user terminal identifies a service which the user 20 wishes to purchase. For example the user may wish to download a video from a web site on the Internet. The content provider 15 who wishes to offer this service has a content server (e.g. WAP server) on which is stored the video (or content) required. The web page associated with the service includes a content proposal page which includes the information which the content provider has in the page. E.g. content information, a small example of the content, price, or information if the price is zero.

The user 20 indicates himself to the content provider 15 as being a user wishing to obtain and pay for the content on that page. Identification and authentication of the user need not take place at this stage.

This is done via signal 21 shown in FIG. 2. By for example clicking a button displayed on the web page the user indicates his desire for the content. This causes the content provider 15 to download data 22 over the data link—to the user terminal. This data does not, at this stage, comprise the content desired by the user. Rather an acceptance question together with charging information is supplied to the user. This charging information includes the price which the user would have to pay to obtain the service content together with the content providers mail address and content provider's bank account number. If the user finds the price for the service to be satisfactory they contact a charging service provider 16 to which they either already subscribe or to which they then subscribe. This may be done automatically by data processors in the user terminal in response to the signals received from the content provider.

Alternatively the user could start the procedure by clicking a button (or activating a menu item) in the terminal, which starts the charging procedure.

The contact made between the user terminal and charging service provider 16 is illustrated by connection 23 in FIG. 2. During this connection data is transferred to the charging service provider 16 which identifies content charging data (i.e. the charge which is to be levied for providing the subscriber with the required service).

The charging service provider 16 then checks to see if the subscriber has sufficient funds or credit to purchase the content. In the case of a prepaid subscriber the user is first required to prepay a sum of money which is paid into an account with the charging service provider associated with that subscriber. This sum has a value which is decremented as the subscriber purchases content. Once the value has dropped to zero or to a value which is less than the cost of a service a user is trying to purchase, the subscriber is prompted to prepay more money. Service will not be enabled unless the subscriber has sufficient funds.

Alternatively the charging service provider 16 can operate a post-paid system whereby subscribers initially are asked to prove their credit worthiness and are thereafter allocated a credit limit. This credit limit is only provided after a credit check has been carried out and the credit limit itself has a value which is decremented as services are purchased. This decrementation is carried out in accordance with the purchased content service price. From time to time subscribers are asked to pay off outstanding debts. If these payments are not made or if the credit limit is reached subscribers are prompted to make a payment. They are not permitted to obtain further content services until such payments are made.

The content service provider 16 thus either indicates the transaction can be accepted, i.e. the subscriber has sufficient prepaid funds or credit or the charging service provider 16 indicates the transaction cannot be carried out. This is reported to the user 20 via a signal shown as connection 24. This includes a transaction ID for the content transaction (i.e. an identifier) which is associated with that particular transaction so that a record of it may be readily identified at a later date if so required. Also included are details of the charging service provider 16 used by the subscriber.

Thereafter the user 20 can choose to accept or not accept the transaction i.e. can indicate whether or not to pay for the content. If the user accepts and purchases the service content, details of the charging service provider 16 are sent from the user terminal (which has just received these from the charging service provider 16 in signal 24) to the content provider 15 along with the content transaction ID, the charging service provider 16 mail address, and the content price. This is illustrated as signal 25.

Having received these details the content provider 15 provides the user with the content together with the content transaction ID. This is illustrated as signal 26. Having received this data the user terminal used by the user 20 signals the content charge (together with transaction ID) to the charging service provider 16 via a signal 27. After this the subscribers account is debited by an amount corresponding to the charge paid by the user for the content purchased for that transaction ID.

In this way content can be purchased from a content provider 15 to whom no previous contact has been made with either the user or charging service provider 16. The details of the charging service provider and content provider are transferred at substantially the same time as the user purchases and obtains the content. These bank details and address details are transferred automatically as the transaction is carried out.

In this way new content providers can offer their services without the lengthy agreements between content provider and charging service provider being in place. It is sufficient that the content provider has a record, associated with the transaction ID of the transaction. This record can, for example, identify the user, details of the charging service provider which has been paid by the user and how much the user has paid. Other details could be included as will be understood by persons skilled in the art. For example there could be also information about the content ("MP3: Bruce Springsteen/River"). It is also possible that this kind of information could be exchanged to the charging service provider together with price.

Likewise the charging service provider has a record of the transaction and receives the details of the particular content provider which supplied the content purchased by the user. In order to pay the content provider the charging service provider can use a standard bank transfer into the bank account 28 of the content provider. Details of this account and of the content provider have already been provided from the content provider via the user terminal during the content purchasing transactions. The charging service provider can either carry out the bank transfer once the amount of money paid by users to the charging service provider in respect of a certain one of the many possible content providers has reached a predetermined value, say £1000, or the content provider can request a bank transfer to be carried out by directly requesting this using the charging service provider details which it has received during the transaction and which are stored in memory associated with each transaction ID.

Figure 3:
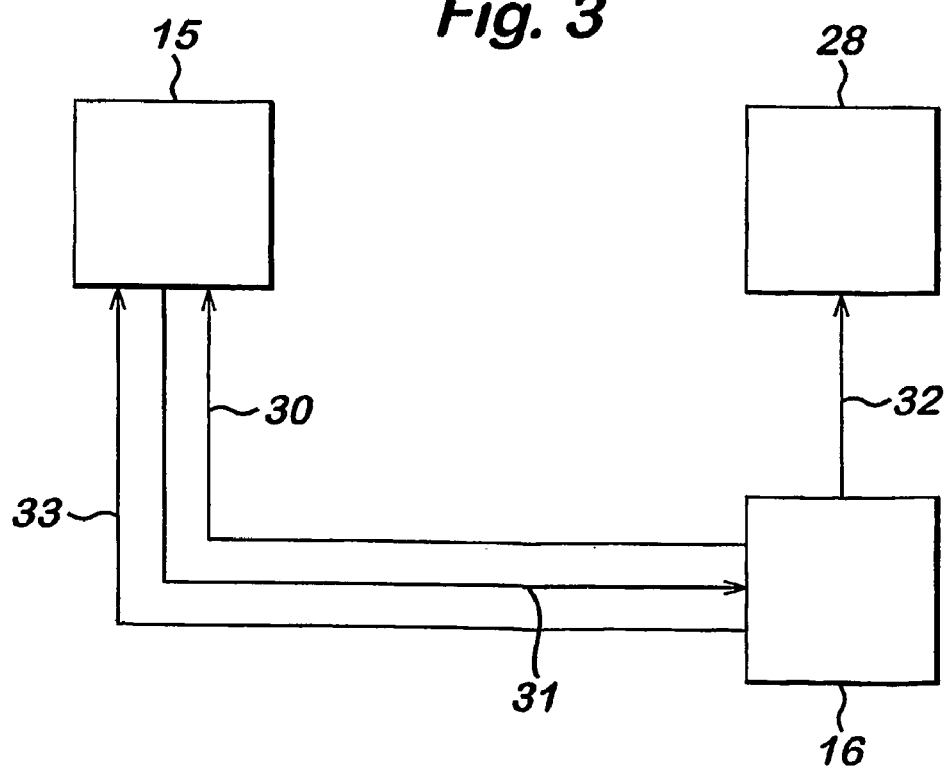
FIG. 3 illustrates how a charging service provider transfers funds.

FIG. 3 illustrates how the transfer of funds takes place from the charging service provider 16 to the content provider 15. As users purchase content services from various content providers 15 they pay the charging service provider 16. The charging service provider accumulates funds accordingly. The funds are stored in a way which enables the charging service provider to identify the funds which have been paid in respect of transactions associated with each particular content provider. The charging service provider will have an account for each content provider it has handled a transaction on behalf of.

The charging service provider periodically checks whether the accumulated funds owed to any one content provider exceeds a minimum bank transfer limit. This predetermined limit can be set at any pre-agreed level for example £1000 or £10,000. When the charging service provider has accumulated payments made by users in respect of a particular content provider which exceed this predetermined limit the content provider is identified for payment. A signal 30 is sent from the charging service provider 16 to the content provider 15. This signal comprises content payment mail which includes for example a request for unpaid transaction identity numbers, prices of each identified transaction, a bank account number and a mail address. The content provider keeps records of each transaction in which a user has purchased content from that content provider. These transactions are identified by the transaction ID created for each transaction. Records in the content provider may be identified by the transaction ID and hold the price paid for that transaction and details of the content service provider used by the user to make-payment. These details are provided to the charging service provider 16 via a signal 31 from the content provider to the charging service provider 16 in response to the signal 30.

The charging service provider 16 compares the details it holds for the transactions with those sent from the content provider 15 (via signal 31). The transaction ID's are compared as are price and bank account details. If all match the charging service provider transfers funds via a bank transfer 32 to the content provider bank account 28. This might be confirmed via a signal from the charging service provider to the content provider that payment has been made.

If the details associated with the transaction identifications do not match the content provider is informed via a signal 33. The charging service provider identifies mismatches and asks for clarification.

As an alternative to transferring funds when a minimum bank transfer limit is reached a charging service provider can carry out a transfer when a predetermined time interval since the last payment has been reached or on predetermined transfer days such as the first day of every month.

In embodiments of the present invention the content provider is provided with means for storing details of each content transaction identifier (ID) together with details of the charging service provider associated with that transaction, the content price and whether or not the transaction was accepted. Likewise the content provider should maintain records detailing each charging service provider 16 with which a user, purchasing content from the content provider has carried out a transaction.

The charging service provider includes means for storing details of users who subscribe and who have either prepaid accounts, in which case a record must be kept of the remaining prepaid sum, or credit accounts, in which case a record must be kept of the remaining unused credit. Each user should be identifiable in some way (such as by noting their MSISDN (mobile subscriber ISDN number). For each subscriber the charging service provider holds a list of transactions. These can be identified by the unique content transaction ID allocated to each transaction. For each transaction the content price and whether or not the transaction was accepted or not is logged. Details of remaining credit limit or prepaid value are also kept.

The charging service provider also holds details for each content provider into which a subscriber has entered a transaction. This content provider account store holds details identifying the content provider, the transaction identifier, the content price, whether the transaction was accepted or not and whether the transaction and content loading was successfully completed. This latter feature could identify when downloading doesn't succeed for some reason (cancelled, interrupted etc.). The charging service provider may also hold details of the accumulated amount of money that the charging service provider has to pay to the content provider.

A separate store in the charging service provider may contain details for each content provider such as name, mailing address and bank account details.

Embodiments of the present invention provide a method and apparatus which enables content providers to charge users for the supply of content. These users may be prepaid users. Embodiments make it easy to start a new content provider service and get users to use it as the system allows an easy way for charges to be billed. The charging service provider collects content charges and accumulates these to relatively large amounts before the money is transferred to the content provider. Normal bank transfers may be used to transfer the money. Content providers always have an account in a bank. Charging service providers have a connection which enables them to pay money to bank accounts. The bank account of the content provider's may be used as a link between the charging service provider and the content provider.

Embodiments of the present invention provide a protocol which defines that the content charging data of the content provider is sent to the service provider. The content price is sent to the subscriber for subscriber acceptance. The content price is sent to the service provider so that the service provider can decrease that price from the users account. The acceptance of the user is thereafter sent to the content service provider.

The charging service provider sends a charging request to the content provider who has to send charging response with all charging information. The charging requests and responses are exchanged, for example via e-mail or some other mutually agreed protocol or method suitable to charging.

In certain embodiments there is a specified format by which the charging service provider sends the charging request to the content provider when there is enough money to be paid to the content provider.

Embodiments of the present invention provide the advantage that prepaid users can use all content pages in the world if the charging service provider to which the prepaid user subscribes offers content charging in accordance with the present invention. Content providers only are required to take care about the content prices and the charging service providers do not have to care about them at all. In other words when content providers wish to remove some service they can just remove them. When they want to change the price they change the price and change their web page and content charging data which is sent with that web page.

It will be understood that the protocols used for transferring and funds between charging service provider, content provider and bank accounts must be secure so that the data cannot be used by any unauthorised third party.

It will be understood that the charging service provider may be a pre-existing telecom operator who provides the telecom service to enable the user to access the Internet. Alternatively the charging service provider may be any third party such as a separate business which is trusted by the content service provider.

If the charging service provider is the telecom operator the network access charges can be also charged from the same account, so it makes the end-user life easier in that way. It would be possible under these of other circumstances for the network service provider to take some amount of money for themselves when they handle that charging. E.g. 0.2% of each case.

It will also be understood by those skilled in the art that modification could be made to the above described examples without departing from the scope of the present invention.

The invention claimed is:

1. A method comprising:
   maintaining, by a service provider, a payment account corresponding to a subscriber;
   receiving, by a receiver of the service provider, charging data from the subscriber, where the charging data is for a transaction and comprises a price of an item and payment information for a content provider providing the item, where the item comprises content or a service;
   in response to the service provider determining that the payment account corresponding to the subscriber has sufficient funds or credit for the transaction, sending a report from a transmitter of the service provider to the subscriber, where the report indicates that the transaction is approved by the service provider, where the report further comprises a transaction identifier for the transaction and service provider details;
   receiving, by the receiver of the service provider, a message from the subscriber, where the message comprises the price of the item and the transaction identifier;
   in response to the receiver of the service provider receiving the message from the subscriber, debiting, by the service provider, the payment account corresponding to the subscriber for the price of the item; and
   in response to occurrence of a predetermined event, paying, by the service provider, an amount of the price of the item to the content provider.

2. The method as claimed in claim 1, where the predetermined event comprises the service provider collecting a predetermined amount of collected charges associated with the content provider.

3. The method as claimed in claim 1, where the payment account comprises a prepaid account in which a value associated with a sum prepaid by the subscriber is stored and where debiting the payment account comprises deducting a value from said stored value.

4. The method as claimed in claim 1, where the payment account comprises a post-paid account having a predetermined credit limit associated with the subscriber and where debiting the payment account comprises deducting a value from the post-paid account in response to a determination that a total value deducted from said post-paid account does not exceed said predetermined credit limit.

5. The method as claimed in claim 4, further comprising:
   in response to a determination that the total value deducted from the post-paid account would exceed said predetermined credit limit, sending a negative message from the service provider to the subscriber, where the negative message indicates that the transaction cannot be carried out.

6. The method as claimed in claim 1, further comprising:
   sending the price of the item to the subscriber for acceptance prior to debiting the payment account.

7. The method as claimed in claim 1, further comprising:
   sending the price of the content from the content provider via a user terminal to the service provider to enable collection of content charges.

8. The method as claimed in claim 1, wherein the predetermined event comprises the occurrence of a predetermined date.

9. The method as claimed in claim 1, where the charging data is provided to the service provider in response to the subscriber requesting the item from the content provider.

10. The method as claimed in claim 1, further comprising:
    changing, by the content provider, the price for the item to a new price and notifying the service provider of the new price in response to the subscriber attempting to purchase the item at said new price.

11. The method as claimed in claim 1, where the predetermined event comprises the service provider receiving a request for payment from the content provider.

12. The method as claimed in claim 1, further comprising:
    sending, by the subscriber, a request for the item to the content provider;
    receiving, by the subscriber, a response to the request from the content provider, where the response to the request comprises the price of the item and the payment information for the content provider, where the charging data is provided to the service provider by the subscriber in response to the subscriber receiving the response to the request from the content provider.

13. The method as claimed in claim 12, where the message comprises a first message, the method further comprising:

in response to the subscriber accepting the approved transaction indicated by the report, sending, from the subscriber to the content provider, a second message comprising the transaction identifier, the service provider details and the price of the item; and receiving, by the subscriber, the item and the transaction identifier from the content provider, where the message is sent from the subscriber to the service provider in response to receipt, by the subscriber, of the item and the transaction identifier from the content provider.

14. The method as claimed in claim 1, where a pre-existing agreement is not in place between the service provider and the content provider prior to the service provider receiving the charging data from the subscriber.

15. An apparatus comprising:

an associater configured to associate a subscriber with a payment account;

a receiver configured to receive charging data from the subscriber, where the charging data is for a transaction and comprises a price of an item and payment information for a content provider providing the item, where the item comprises content or a service;

a transmitter configured, in response to a determination that the payment account corresponding to the subscriber has sufficient funds or credit for the transaction, to send a report to the subscriber, where the report indicates that the transaction is approved, where the report further comprises a transaction identifier for the transaction and service provider details, where the receiver is further configured to receive a message from the subscriber, where the message comprises the price of the item and the transaction identifier; and a collector configured, in response to receiving the message from the subscriber, to debit the payment account associated with the subscriber for the price of the item, where the apparatus is configured, in response to occurrence of a predetermined event, to pay an amount of the price of the item to the content provider.

16. An apparatus, comprising:

means for associating a subscriber with a payment account;

means for receiving charging data from the subscriber, where the charging data is for a transaction and comprises a price of an item and payment information for a content provider providing the item, where the item comprises content or a service;

means for sending, in response to a determination that the payment account corresponding to the subscriber has sufficient funds or credit for the transaction, a report to the subscriber, where the report indicates that the transaction is approved, where the report further comprises a transaction identifier for the transaction and service provider details, where the means for receiving is further for receiving a message from the subscriber, where the message comprises the price of the item and the transaction identifier; and means for debiting, in response to receiving the message from the subscriber by the means for receiving, the payment account associated with the subscriber for the price of the item, where the apparatus is configured, in response to occurrence of a predetermined event, to pay an amount of the price of the item to the content provider.

17. The apparatus as claimed in claim 15, where the apparatus comprises a service provider.

* * * * *